(12) United States Patent
Geist et al.

(10) Patent No.: US 10,418,711 B2
(45) Date of Patent: *Sep. 17, 2019

(54) RFID ANTENNA STRUCTURE FOR INCREASED RANGE WHEN COUPLED WITH A MOBILE DEVICE

(71) Applicant: GEOTOLL, INC., Cooper City, FL (US)

(72) Inventors: Wyatt Drake Geist, Davie, FL (US); Jaime Andres Borras, Pembroke Pines, FL (US)

(73) Assignee: GEOTOLL, Inc., Cooper City, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,134

(22) Filed: May 21, 2018

(65) Prior Publication Data

US 2018/0277957 A1 Sep. 27, 2018

Related U.S. Application Data

(63) Continuation-in-part of application No. 14/713,145, filed on May 15, 2015, now Pat. No. 9,978,009, and (Continued)

(51) Int. Cl.
*H01Q 9/06* (2006.01)
*H01Q 1/22* (2006.01)
*H01Q 7/08* (2006.01)
*H01Q 21/28* (2006.01)
*H01Q 1/24* (2006.01)
*H01Q 9/28* (2006.01)
(Continued)

(52) U.S. Cl.
CPC ......... *H01Q 9/065* (2013.01); *G06K 7/10346* (2013.01); *G06K 7/10386* (2013.01); *G06K 19/0726* (2013.01); *G06K 19/07786* (2013.01); *H01Q 1/2208* (2013.01); *H01Q 1/2225* (2013.01); *H01Q 1/243* (2013.01); *H01Q 1/248* (2013.01); *H01Q 5/335* (2015.01); (Continued)

(58) Field of Classification Search
CPC .................................. G06K 19/07773–07794
See application file for complete search history.

(56) References Cited

U.S. PATENT DOCUMENTS 6,166,638 A 12/2000 Brady et al.
6,320,509 B1 11/2001 Brady et al.
(Continued)

*Primary Examiner* — Laura N Nguyen
(74) *Attorney, Agent, or Firm* — The Concept Law Group, PA; Scott M. Garrett; Scott D. Smiley

(57) ABSTRACT

An RFID tag device with an RFID antenna assembly that increases transmission range of the RFID tag device when adhesively coupled to a mobile device. The RFID tag device includes a RF interface that operates at a first RF frequency, a controller coupled to the RF interfaces, and the RFID antenna assembly. The RFID antenna assembly includes a first and a second dipole elements, each shaped as a half rectangle with an additional segment joining the respective element to a tuning element. The RFID antenna also includes a tuning element, which is a loop antenna, connecting the RF interface to the controller and a ferrite dielectric on the back of one of the dipole elements. A structure of the RF antennal assembly, when the RFID tag device is coupled to a mobile device, causes the mobile device to function as a reflector to increase gain of the RFID antenna assembly thereby improving transmission range.

17 Claims, 8 Drawing Sheets

Related U.S. Application Data a continuation-in-part of application No. 13/945,990, filed on Jul. 19, 2013, now Pat. No. 9,633,243.

(51) Int. Cl.

| | | |
|---|---|---|
| *H01Q 7/00* | (2006.01) | |
| *H01Q 5/335* | (2015.01) | |
| *H04B 5/00* | (2006.01) | |
| *G06K 7/10* | (2006.01) | |
| *G06K 19/07* | (2006.01) | |
| *G06K 19/077* | (2006.01) | |

(52) U.S. Cl.
CPC ............... *H01Q 7/00* (2013.01); *H01Q 7/08* (2013.01); *H01Q 9/285* (2013.01); *H01Q 21/28* (2013.01); *H04B 5/0031* (2013.01)

(56) References Cited

U.S. PATENT DOCUMENTS

| | | | |
|---|---|---|---|
| 6,441,740 | B1 | 8/2002 | Brady et al. |
| 7,232,069 | B1 | 7/2007 | White |
| 2006/0152369 | A1 | 7/2006 | Reunamaki |
| 2007/0046475 | A1* | 3/2007 | Carrender ............. G08B 13/24 340/572.7 |
| 2009/0033498 | A1 | 2/2009 | Huomo |
| 2009/0096696 | A1 | 4/2009 | Joyce, Jr. et al. |
| 2009/0117872 | A1 | 5/2009 | Jorgenson et al. |
| 2009/0315673 | A1 | 12/2009 | Huang |
| 2012/0086556 | A1* | 4/2012 | Ikemoto ............ G06K 19/07749 340/10.1 |
| 2012/0104103 | A1* | 5/2012 | Manzi ............... G06K 19/07749 235/492 |
| 2012/0112887 | A1 | 5/2012 | Horne et al. |
| 2014/0001270 | A1 | 1/2014 | Kikuchi et al. |
| 2014/0025444 | A1 | 1/2014 | Willis |
| 2014/0027520 | A1* | 1/2014 | Kato ..................... H04B 5/0075 235/492 |
| 2014/0209691 | A1 | 7/2014 | Finn et al. |
| 2014/0217175 | A1 | 8/2014 | Fogg et al. |
| 2014/0229246 | A1 | 8/2014 | Ghaffari |
| 2015/0119728 | A1 | 4/2015 | Biackadar et al. |
| 2015/0294210 | A1 | 10/2015 | Martinez de Velasco Cortina et al. |
| 2017/0084980 | A1 | 3/2017 | Kato |

* cited by examiner

RFID ANTENNA STRUCTURE FOR INCREASED RANGE WHEN COUPLED WITH A MOBILE DEVICE

CROSS-REFERENCE TO RELATED APPLICATIONS

This application is a continuation in part of, and claims the benefit of U.S. patent application Ser. No. 14/713,145, titled "RFID Antenna Structure for Increased Range When Coupled with a Mobile Device," filed May 15, 2015.

Through that application, this application further claims the benefit of:

U.S. patent application Ser. No. 13/945,990, titled "Method and Apparatus for Facilitating a Wireless Transaction Event via a RFID Tag Device With a Mobile Device," filed Jul. 19, 2013; and U.S. Provisional 61/993,359 titled "Antenna Coupling to Mobile Device" filed May 15, 2014.

The entire contents of U.S. Prov. App. No. 61/993,359 and U.S. patent application Ser. Nos. 13/945,990 and 14/713,145 are hereby incorporated by reference.

FIELD OF THE DISCLOSURE

The present disclosure relates generally to data tag devices and more particularly to radio frequency data tag devices used to conduct transactions.

BACKGROUND

As a result of the prevalence of mobile devices, such as smart phones, tablet devices, and others, there has been an increased interest in using such devices to automate a variety of tasks not traditionally associated with mobile devices. Another field that has gained in interest is radio frequency identification (RFID) data tag devices. RFID tag devices are used to store information, such as an identifier, that can be read at a distance by a reader. The reader transmits a signal through the air, and, upon receiving the signal, the RFID tag device responds by transmitting data to the reader. RFID tag devices are used in numerous applications, and can be passive or active, referring to how the RFID tag device is powered.

One field where RFID technology is presently used is for transactions. An RFID tag device identifier can be associated with an account, and money transferred from the account to an authorized recipient upon reading information from the RFID tag device in an authorized manner. One popular use of RFID technology for transactions is in vehicular tolls. A vehicle operator purchases a toll tag that includes an RFID tag device, having an identifier in the RFID tag device. The identifier is associated with a toll account for a toll authority. The vehicle operator places the toll tag in a vehicle, and upon passing through a toll gateway where the RFID tag device information is read, a toll fee is debited from the account associated with the toll tag. The toll tag devices are often mounted in the vehicle in a permanent or semi-permanent manner. Consequently, the RFID tag device cannot easily be moved from one vehicle to another, such as if the owner of the RFID tag device rents a vehicle. Furthermore, the user is not able to interact with the RFID tag device. In order to see account activity, the user must access account information, such as via a web site for such accounts.

Attempts to integrating an RFID tag with a mobile device presents a number of technology based problems. Specifically, the placement of an RFID tag near a ground plane, such as one represented by a mobile device, results in a significant performance degradation of the RFID tag such that the transmission distance of the RFID tag is adversely affected. In a vehicle toll situation, an effective distance of over 20 feet from the location of an RFID tag to a toll reader can be required, simply positioning a standard RFID tag on back of a mobile device makes it non-functional due to the ground plane detuning effects. Separation from a ground plane by a significant distance (at least 6 mm in some instances) minimizes the degradation effects of the ground plane on the transmittal range of the RFID tag. In instances where a direct coupling between a mobile device exterior casing and an RFID tag are desirable (i.e., placing an RFID tag as a sticker on the back of a mobile telephone or tablet), the distance of separating the RFID tag by at least 6 mm is unfeasible. Attenuation problems resulting from RFID tags being coupled to mobile devices have not been satisfactorily solved by any known prior art teachings outside the present disclosure.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
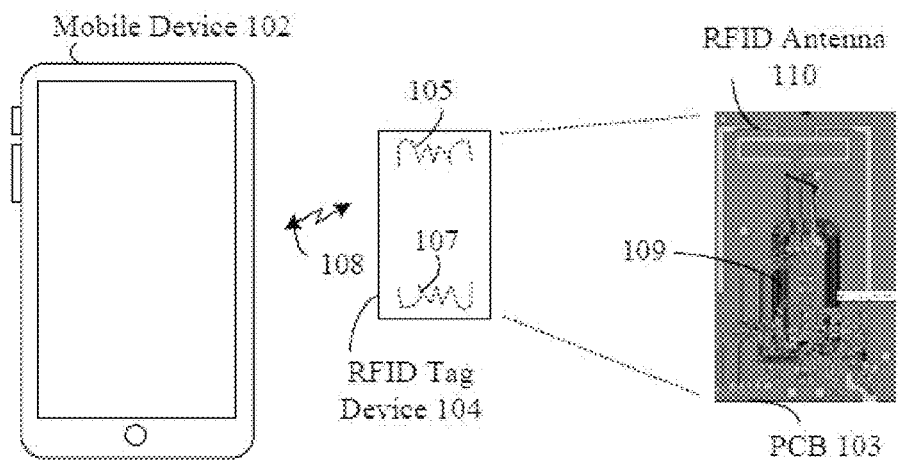
FIG. 1A shows a system of a mobile device and RFID tag device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The disclosure provides for a Radio Frequency Identification (RFID) tag device for operation in close proximity to a ground plane. The disclosed RFID tag device couples energy into a proximate mobile device rather than energy from the RFID tag device being attenuated by the ground plane of the mobile device's components. In embodiments, the proximate mobile device actually increase the RFID antenna gain of the RFID tag device's antenna, which improves radio frequency (RF) transmission range of the RFID tag device. In one embodiment, the RFID antenna structure includes a dipole structure and a tuning loop. In one contemplated embodiment, the RFID tag can include a near field communication (NFC) antenna assembly that powers the RFID tag based on captured energy emitted by a NFC transmitter of the mobile device. An embodiment having both an RFID antenna and a NFC antenna may require a balancing of distance and power, as the NFC antenna must be sufficiently close to the NFC transmitter to effectively capture energy for use by the RFID tag device while the RFID antenna must be shaped and distanced from the ground plan (of the mobile device's components) to ensure RFID tag device emitted energy interacts with the proximate mobile device for a gain' (as opposed to the proximity of the mobile device resulting in signal attenuation).

FIG. 1A shows a system of a mobile device 102 and RFID tag device 104 in accordance with some embodiments. The mobile device 102 is a small, portable computing device that includes one or more radio transceivers. Examples of mobile devices include, for example, cellular or "smart" phones, tablet computing devices, personal digital assistants, a wearable device, and so on. The RFID tag device 104 is an electronic device that utilizes electromagnetic fields to transfer data, for the purposes of automatically identifying and tracking an object in proximity to the RFID tag. One, non-limiting, use case for the RFID tag device 104 is for vehicular tolls, but other applications are contemplated. In some embodiments, the RFID tag device 104 can include a first RF interface 107 to communicate with the mobile device 102 via radio link 108 and a second RF interface 105 to communicate with another device, such as an RFID reader over a second radio link. An RFID antenna assembly 110 (shown on printed circuit board 103 of device 104), which is designed for maximizing transmission distances while in close proximity to mobile device 102, is associated with the second RFID interface 105. The second RF interface 105 allows for far-field communications (twenty to one hundred feet, for example) with the RFID reader, which facilitates use of the RFID tag device 104 in retail, tracking, and payment applications. PCB 103 includes NFC antenna 109 for the first RF interface 107.

Embodiments are contemplated where multiple devices interact such that together they perform equivalent functionality to that indicated in the disclosure. For example, a wrist wearable computing device (such as a smart watch) can be communicatively linked (e.g. BLUETOOTH paired) to a smartphone. Together the paired devices provide the functionality of mobile device 102 expressed herein. In such an embodiment, the RFID tag device 104 can be coupled to (or integrated with) the wearable computing device. U.S. provisional 61/993,359 to which priority is claimed (specifically referencing the section labeled "Wearable Wristband for Tolling") elaborates on such an embodiment. In embodiments where a wearable device is coupled to RFID tag device 104, the wearable device's components function as the ground plane discussed herein and provide the transmission gain that results from the RFID antenna assembly 110 as described herein.

Figure 1B:
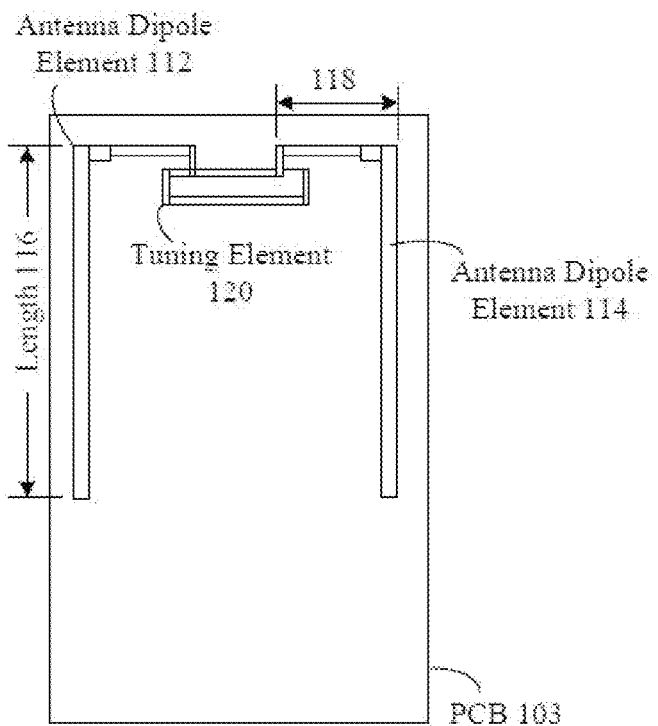
FIG. 1B shows an RFID antenna assembly that includes two symmetrical dipole elements in accordance with some embodiments.

As shown by FIG. 1B, the RFID antenna assembly 110 includes two symmetrical dipole elements (112, 114) extending along a periphery of a circuit board of the RFID tag device 104. Each dipole element 112, 114 joins to a tuning antenna element 120. The tuning antenna element 120 is a loop antenna separating the two symmetrical dipole elements 112, 114. Each dipole element 112, 114 can be shaped as a half rectangle or "L" with an additional segment joining the element 112, 114 to the tuning element 120. As arranged, the symmetrical dipole elements 112, 114 can be mirror images of each from a perspective of a vertical centerline. The tuning element 120 can be a substantially rectangularly shaped element placed between the dipole elements 112, 114.

In one embodiment, a length 116 of a peripheral portion of each of the dipole elements 112, 114 can be 50 mm (+/−10 percent). A length 118 of each dipole element 112, 114 can be approximately 20 mm (+/−10 percent), a connecting length between each dipole element 112, 114 and the tuning loop can be 5 mm (+/−10 percent). The tuning loop 120 can have a long side of approximately 32 mm (+/−10 percent) and a short side of approximately 7 mm. A space between the segment joining element 112 (to tuning loop 120) and the segment joining element 114 (to the tuning loop) can be 1 to 12 mm in embodiments.

One of ordinary skill recognizes that the geometry of the RFID antenna assembly 110 will naturally vary based on the frequency of emissions, substrate dielectric constant, etc. and that the above embodiment and sizes correspond to a UHF (915 MHz) RFID tag device 104. Adjustments of the above optimized for other transmission frequencies and device configurations are easily within the scope of the knowledge of one of ordinary skill (based on the disclosure herein) without undue experimentation.

Figure 2:
FIG. 2 shows an electric (E) field distribution of the antenna on a printed circuit board in proximity to a phone in accordance with some embodiments.

FIG. 2 shows an electric (E) field distribution of the antenna on a printed circuit board in proximity to a phone (specifically a SAMSUNG S3 phone was used to generate the test numbers expressed in the table of FIG. 2) in accordance with some embodiments.

Figure 3:
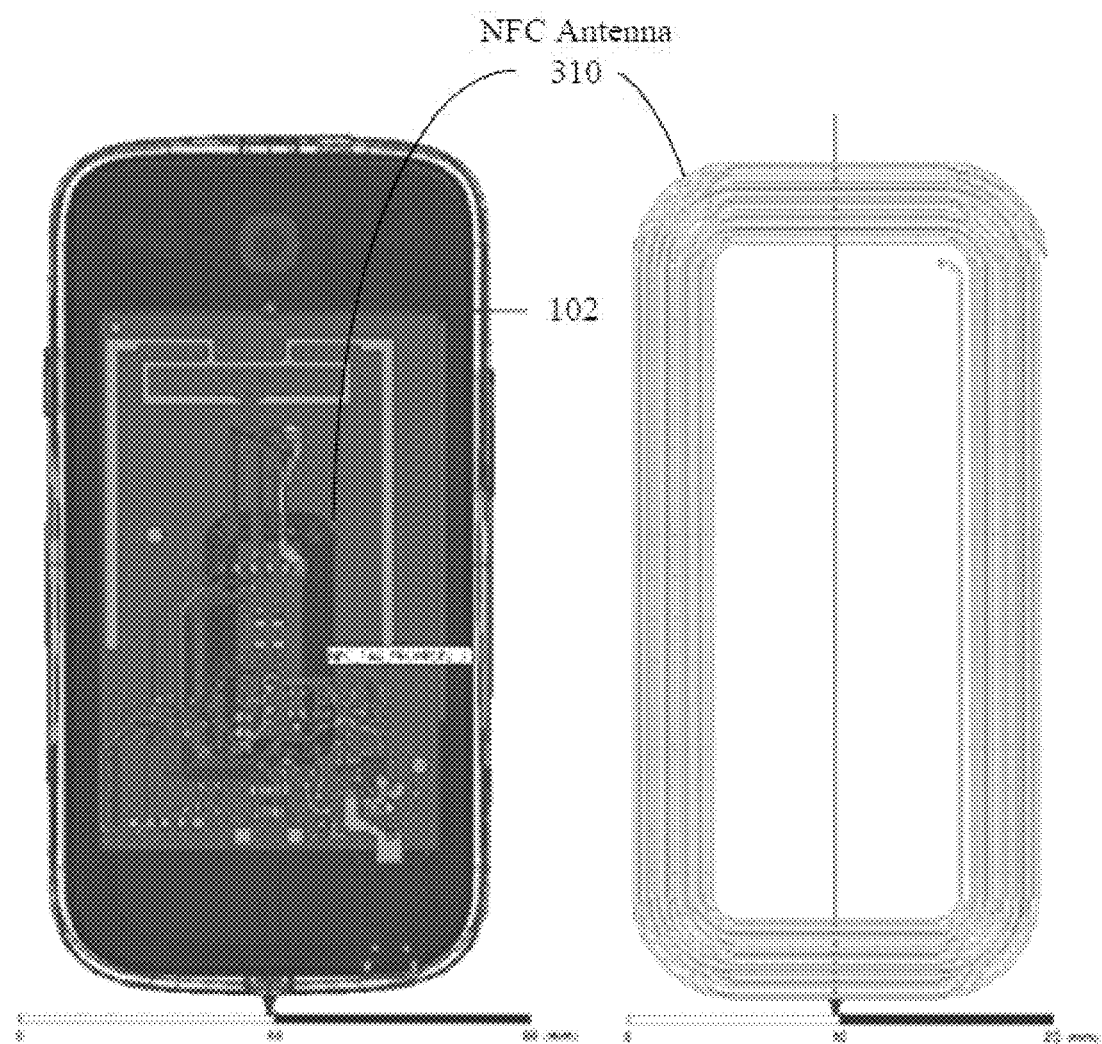
FIG. 3 shows the RFID antenna assembly and a near field communication (NFC) antenna on a single printed circuit board layout in accordance with some embodiments.

FIG. 3 shows the RFID antenna assembly 110 and an additional NFC antenna on a single printed circuit board layout in accordance with some embodiments. The NFC antenna 310 can be a component of the first RF interface 107 that communicates with the mobile device 102 via radio link 108. The NFC antenna 310 can be coupled to an energy collection circuit. Thus, RF transmissions (such as near-field transmission) from the mobile device 102 are captured by the NFC antenna 310 to power circuity of the RFID tag device 104. NFC antenna 310 can also be used to generate and receive NFC data signals to/from the mobile device thereby permitting communications over radio link 108.

In this embodiment, the NFC antenna 310 is positioned in approximately the center of the printed circuit board, as is the tuning loop 120, between the dipole elements 112, 114. The NFC antenna 310 represents a rectangular coil with rounded edges of a substantially flat plane. The NFC antenna can be positioned between the dipole elements 112, 114 where approximately (+/−20 percent) half of the NFC antenna 310 is above a bottom of length 118 and approximately half of the antenna 310 is positioned above the bottom of length 118. The NFC antenna 310 in one embodiment has a short side of approximately 20 mm (+/−10 percent), and a long side of approximately 40 mm (+/−10 percent).

Figure 4:
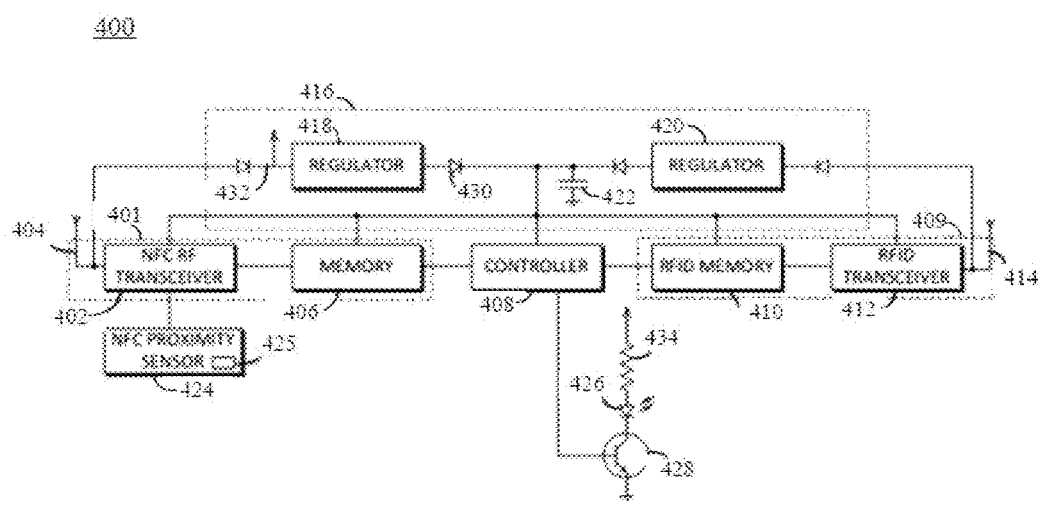
FIG. 4 is a schematic diagram of a RFID tag device in accordance with some embodiments.

FIG. 4 is a schematic diagram of a RFID tag device 400 in accordance with some embodiments. The RFID tag device 400 can be substantially similar to the RFID tag device 104 shown in FIG. 1. Generally, the RFID tag device 400 includes circuitry to realize two different RF interfaces, and can include a memory associated with each interface, a controller for operating the RFID tag device, and an energy collection circuit to collect energy from the RF interfaces to power the RFID tag device 400. Accordingly, the RFID tag device 400 includes a first RF interface 401, that can be, for example, a NFC RF interface. The first interface 401 includes an antenna 404 and a first transceiver 402 that communicates according to a first RF protocol, such as an NFC protocol. The first RF interface 401 can further include a first memory 406 coupled to the first transceiver 402, and can be used to store data received over the first RF interface 401, or data that is to be transmitted over the first RF interface 401, or both.

The RFID tag device 400 further includes a second RF interface 409, such as a RFID interface, that includes antenna 414 and a second transceiver 412 to communicate according to a second RF protocol, such as, for example, an RFID communication protocol. The second RF interface 409 operates independently of the first RF interface 401. The second RF interface 409 can further include a second memory 410, such as an RFID memory, that can be coupled to the second transceiver 412 and can contain, for example, one or more substantially unique identifiers that can be used to identify the RFID tag device 400, and which can be associated with a user or a user account in remotely located computing equipment (e.g. account servers).

In some embodiments it is contemplated that there is only one memory shared by each of the RF interfaces 401, 409. In some embodiments, the controller 408 can be provided with registers, cache, or other memory, that can operate as the first and second memories 406, 410. Furthermore, the first memory 406, when implemented as a separate memory, can be a dual interface memory that can be accessed by the first transceiver 402 and the controller 408 by separate, independent memory interfaces. The controller 408 can move data between the memories 406, 410, as well as perform other operations such as formatting data when moving data between memories 406, 410. In some embodiments memory 410 is a ROM, and data received via first RF interface 409 is routed directly to the controller 408. In some embodiments memory 406 is a dual interface memory that is writable, and non-volatile.

The RFID tag device 400 further includes an energy collection circuit 416 that is used to collect energy received from remote transmitters at antennas 404, 414. A first regulator 418 can be used to collect energy at the first RF interface antenna 404, and a second regulator 420 can be used to collect energy at the second RF interface antenna 414. Simple rectifiers (diodes) between antennas 404, 414 and regulators 418, 420 can be used to rectify alternating current (AC) signals to store charge in, for example, a capacitor 422, through blocking diodes 430. The capacitor 422 can be electrically coupled to the interfaces 401, 409, alternatively or at the same time, and the controller 408, to provide power to those components as necessary.

The RFID tag device 400 can further contain circuitry to facilitate optimum location of the RFID tag device 400 on a mobile device. For example, a light emitting diode 426 can be controlled by a switch transistor 428 that is operated by the controller 408. Upon power-up or receiving an appropriate command via first RF interface 401 from the mobile device, the controller can switch on transistor 428, allowing current to flow through LED 426 from node 432, as limited by resistor 434. During this operation the mobile device continuously transmits over the NFC RF interface so that capacitor 422 is continuously receiving electrical energy via regulator 418. The resulting voltage evident across node 432 is dependent on the efficiency of the coupling between the NFC transmitter of the mobile device and the first RF interface 401. As the RFID tag device is moved relative to the mobile device, the intensity of light emitted from the LED varies in correspondence with the efficiency of the NFC link, allowing the user to optimally locate the RFID tag device 400 on the mobile device.

Figure 5:
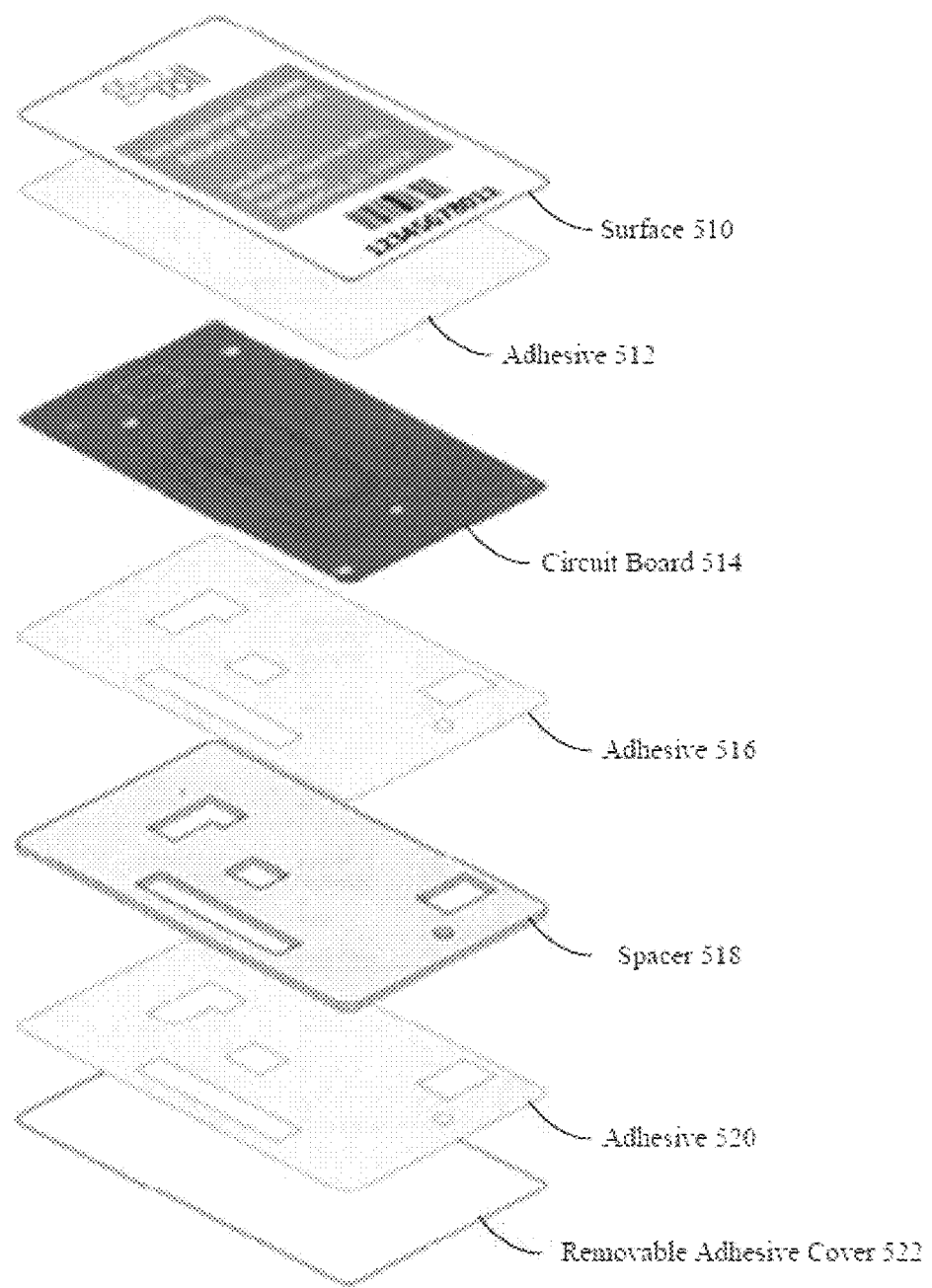
FIG. 5 shows a decomposition of one embodiment of an adhesive coupled RFID device in accordance with some embodiments.

Embodiments of the disclosure permit the RFID tag device 104 to be adhesively coupled to the mobile device 102. Spacing between interior components of the mobile device 102 (functioning as a ground plane) and the circuit board of the RFID tag 104 can be less than 5 mm in embodiments, while still not having adverse attenuation effects to the range of the RFID tag device 104 due to the RFID antenna assembly 110 utilized herein. FIG. 5 shows a decomposition of one embodiment of an adhesive coupled RFID device 104. The device can include a top printed surface 510, coupled via adhesive 512 to a circuit board 514, coupled with adhesive 516 to a spacer 518, coupled with adhesive 520 to a removable adhesive cover 522, which has a removable adhesive protector 420.

Surface 510 can provide an identifier for the RFID tag device 104, which may include a unique key, bar code, or other unique identifier. This identifier can be used to uniquely identify the RFID tag, such as for activation purposes and/or for linking this identifier to a mobile device 102. Once linked, a mobile device 102 identifier can be utilized as a unique reference in addition to (or as an alternative to) utilizing any identifier printed on surface 510.

The circuit board 514 represents a printed board, such as shown in FIG. 1. The printed circuit board includes the RFID antenna assembly 110. In some embodiments, an additional NFC antenna 310 can be included on the circuit board 514.

Spacer 518 can be formed from a foam material or other insulator. Use of a compressible foam as a spacer can be beneficial in embodiments that rely on double-sided pressure sensitive adhesives to bond between layers and surfaces.

The adhesive layers 512, 516 can be a low surface energy (LSE) adhesive designed to bond to hard to stick to surfaces, such as plastics, polypropylene, polyethylene, polystyrene, thermoplastic polyolefins, EVA, PTFE, powder coated paints and oily metal surfaces. A pressure sensitive adhesive tape can be used as an adhesive layer 512, 516 in contemplated embodiments. For example, in one embodiment, layers 516 and 520 can utilize a double-sided 300 LSE adhesive tape and layer 512 can be a double-sided 467 LSE adhesive tape.

In one arrangement adhesive layer 520 can be an adhesive vinyl that provides for pressure-sensitive adhesive bonds for low and high surface energy materials. Specifically, layer 520 can be designed to form a strong bond with materials of an outer case of mobile device 102, which include polycarbonate material, SE and HSE plastics, metals, fiberglass, and wood materials present in commercially available mobile devices.

Figure 6:
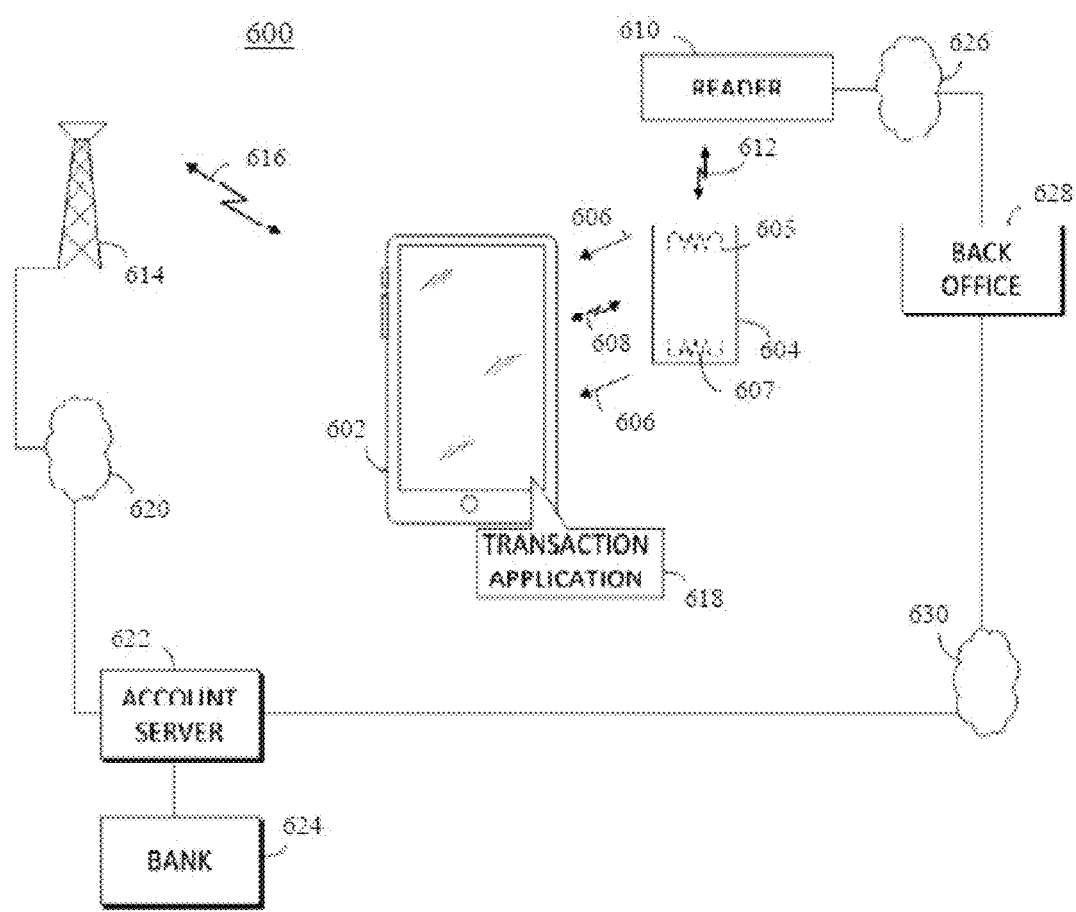
FIG. 6 shows a system of a mobile device and RFID tag device in accordance with some embodiments.

FIG. 6 shows a system view 600 of a mobile device 602 and RFID tag device 614 in accordance with some embodiments. In addition to radio interface(s), a mobile device 602 includes a graphical display and input means to allow a user of the mobile device 602 to interact with, and control operation of the mobile device 602, as well as memory and a processor to execute program code for applications, programs, operating systems, and other software elements. The memory includes read only memory (ROM) and random access memory (RAM), and can include other types of memory such as flash memory, and can include memory expansion such as memory card slots.

The RFID tag device 604 contains identity information that can be used for conducting wireless transactions. Accordingly, the RFID tag device 604 includes at least two radio frequency (RF) interfaces. A RF interface is a wireless radio interface and includes an antenna and transceiver that operate according to a defined protocol or air interface. The air interface defines channel format, timing, modulation, and other aspect for radio communication. The RFID tag device 604 includes a first RF interface 607 to communicate with the mobile device 602 via radio link 608, and a second RF interface 605 to communicate with another device, such as an RFID reader 610, over radio link 612. The radio links 608, 612 indicate communication between the devices over their respective RF interfaces. The RFID tag device 604 can be held against, or substantially close to the mobile device 602, such as by forming the RFID tag device 604 in the form of a card with an adhesive layer to affix the RFID tag device 604 onto a surface (such as a back surface) of the mobile device 602 as indicated by arrows 606. In some embodiments the mobile device 602 and RFID tag device 604 communicate via radio link 608 using a near field communication (NFC) protocol, such as that specified by ISO/IEC 18000-3 which has an effective range of about 10 cm and operates at 13.56 MHz. Typically the NFC communication between the mobile device 602 and the RFID tag device 604 will be encrypted for security purposes. In addition to exchanging data over the radio link 608, the mobile device 602 can power the RFID tag device 604 via radio link 608. The energy of the NFC signal from the mobile device can be collected in the RFID tag device and used to power the circuitry of the RFID tag device 604 which responds to the mobile device over link 608, as well as for RFID operations via radio link 612. Radio link 612 between the RFID tag device and RFID reader 610 can be a RFID interface, such as, for example, that specified by ISO/IEC 18000-6c, ISO/IEC 18000-6b, or other known RFID interface standards. In some embodiments, the link 612 can be specifically configured to operate according to a vehicular toll standard for use in wireless tollway systems. In such embodiments, the RFID reader 610 can be a tollway reader that is positioned over a traffic lane of a toll road. The RFID reader 610 includes an antenna and transceiver to support communications with RFID tag devices, as is known. As the RFID tag device 604 passes by the reader 610, a signal from the reader 610 causes the RFID tag device 604 to respond via link 612 with identification information to identify the RFID tag device 604. Furthermore, the reader 610 can, in some embodiments, transmit transaction information to the RFID tag device 604 via link 612. The transaction information can include information such as an identification of the reader 610, location, a toll amount, the time, and so on. In some embodiments the reader 610 does not transmit transaction information to the RFID tag device 604, and the RFID tag device 604 only indicates to the mobile device 602 that it has been read (i.e. that it has responded to a reader signal).

The mobile device 602 contains a transaction application 618 in some embodiments that allows the mobile device 602 to facilitate transactions, including processing transaction information received from the RFID tag device 604 or transaction information generated by the mobile device 602 upon receipt of an indication of a transaction by the RFID tag device 604, and forwarding the transaction information to an account server 622. In some embodiments the mobile device 602 initializes the RFID tag device 604 via link 612 before the RFID tag device interacts with the RFID reader 610 via link 608. For example, in a vehicular toll embodiment, the mobile device 602 can determine that the mobile device 602 is approaching a known toll gateway location using location information and road map data that indicates the location of toll gateways. When the mobile device 602, is within a selected distance of a toll gateway, the mobile device 602 can energize NFC link 608 to power up the RFID tag device 604. As the mobile device 602 and RFID tag device 604 pass through the toll gateway, the toll transaction occurs over link 612, and the RFID tag device 604 transmits transaction information to the mobile device 602 via link 608. Any transaction information received at the mobile device 602 from the RFID tag device 604 can be processed by the transaction application 618, which can store the transaction information as well as display the transaction information upon receipt of the transaction information, or at a later time upon user request. Once the RFID tag device 604 completes transmitting to the mobile device 602 subsequent to the transaction, the mobile device 602 can shut off the NFC link 608 to conserve battery life of the mobile device 602.

In some embodiments the mobile device 602, in addition to the radio interface to support radio link 108, comprises another radio interface to communicate at farther distances, such as a cellular transceiver for communicating over a cellular radio telephony link 616 with a cellular telephony infrastructure network 614. The cellular radio telephony link 616 is operated in accordance with a cellular data communications standard, such as, for example, the Long Term Evolution (LTE) standard, the Global System for Mobile Communications (GSM) Enhanced Data rates for GSM Evolution (EDGE), or code division multiple access (CDMA), among other known standards. The mobile device 602 can transmit transaction information over the cellular telephony radio link 616, through a wide area network 620, such as the Internet, to an account server 622 that maintains account information for an account 623 associated with the RFID tag device 604. The account server 622 can be linked to one or more banks 624 to maintain funding for transactions applied to the account 622 associated with the RFID tag device 604. The account server 622 can communicate with a back office server 628 that is associated with reader 610 over similar, if not the same, networks 620, 630. The back office server 628 logs transaction information and reconciles payment of funds due with the account server 622. Processing the transaction information is typically performed by batch processing, although in some embodiments it is contemplated that processing can be performed on a per-transaction or per-occurrence basis. The account server 622 can verify transactions based on transaction information received from the mobile device 602. The mobile device, in some embodiments, can use other radio interfaces such as, for example, a wireless local area network (WLAN) interface, such as that described in the Institute of Electrical and Electronic Engineers (IEEE) standard 802.11, and often referred to as "Wi-Fi." In some embodiments the mobile device 602 can use the near field communication interface 608 to communicate with another device besides the RFID tag device 604, which can include a networked device that can forward transaction information from the mobile device 602 to the account server 622.

Figure 7:
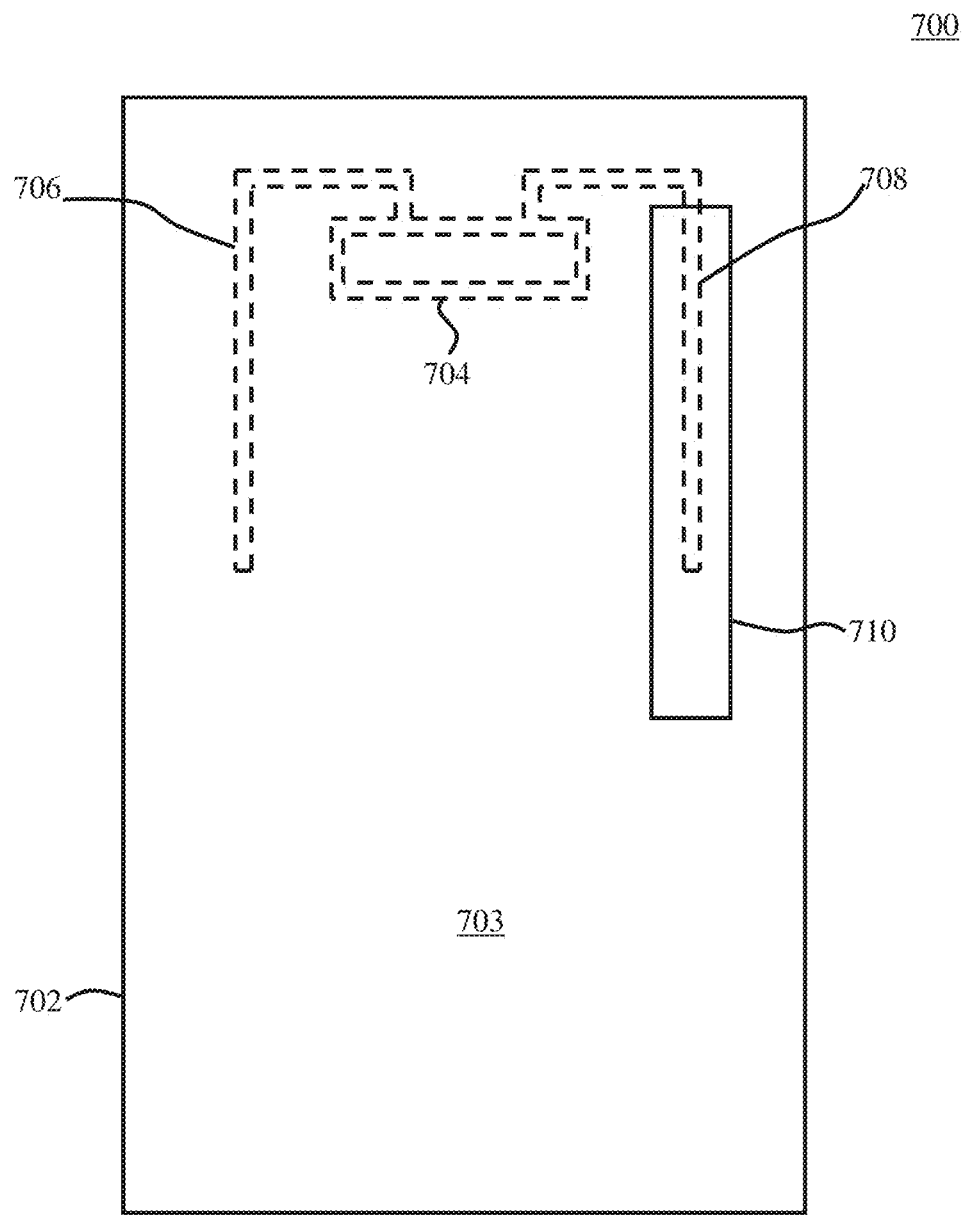
FIG. 7 shows an RFID antenna assembly that includes two symmetrical dipole elements with a ferrite element disposed behind one dipole element, in accordance with some embodiments.

FIG. 7 shows an RFID antenna assembly 700 that includes two symmetrical dipole elements with a ferrite element disposed behind one dipole element, in accordance with some embodiments. A circuit board 702 carries the antenna structure substantially as shown in FIG. 1B, but in this view it is the rear side 703 that is seen. Accordingly the antenna structure formed by conductor elements on the front of the circuit board are shown here in dashed line. The antenna structure includes a loop element 704 that is fed at the bottom of the loop from an RF circuit which also receives signals at the feed points. The antenna assembly 700 further includes dipole elements 706, 708, where dipole element 708 can be a negative dipole element. The dipole elements 706, 708 are half rectangles, or "L" shaped, with a long segment connected to a short segment at substantially a right angle, and the end of the short segment being connected to the top of the loop element 704. On the side of the circuit board 702 facing outward in the drawing, a ferrite bar or pad 710 is mounted in correspondence with the long segment of one of the dipole elements on the other side of the circuit board 702. The circuit board 702 can be a multilayer circuit board having an internal ground plane layer that is between the dipole element 708 and the ferrite ad 710. The ferrite pad 710 is a dielectric element, and acts as an isolator to increase the electrical distance of the antenna assembly from the ground plane. This increases the range at which the RFID device can receive and transmit signals.

Figure 8:
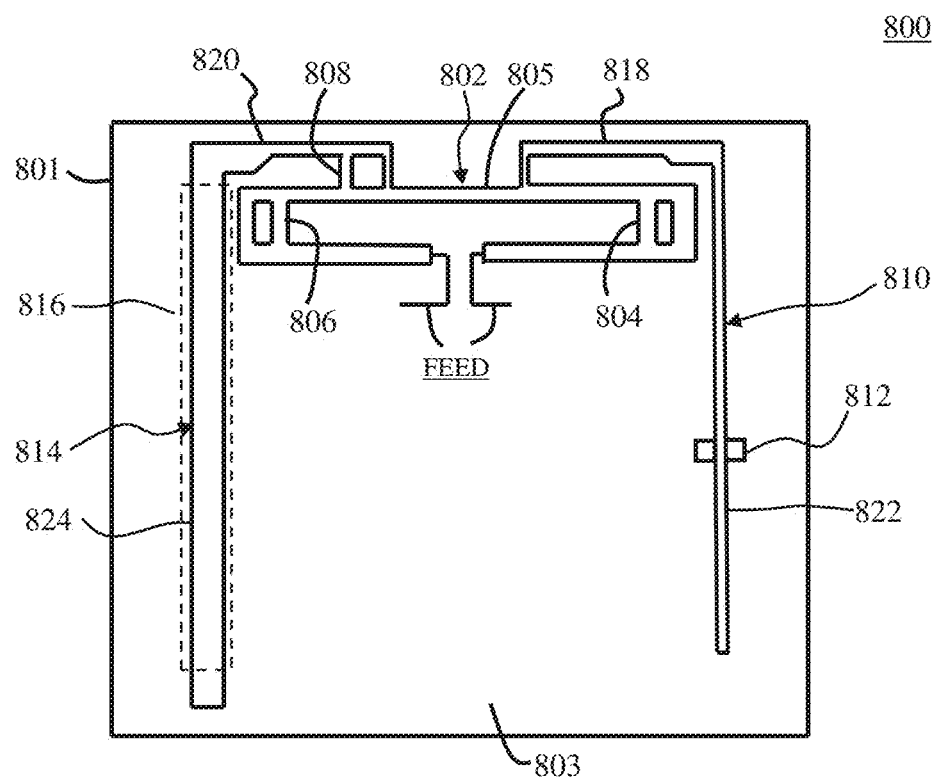
FIG. 8 shows an RFID antenna structure including removable links that can be used to adjust the operating frequency of the antenna, in accordance with some embodiments.

FIG. 8 shows an RFID antenna structure 800 including removable links that can be used to adjust the operating frequency of the antenna, in accordance with some embodiments. The antenna structure 800 is similar to that shown in previous drawings, and includes a loop element 802 at is fed by the RFID IC and two "L" shaped dipole elements 810, 814. That is, the RF IC of the RFID tag device both receives and transmits via the feed point at which it is connected to the antenna structure. The loop antenna element 802 can include one or more shorting sections 804, 806. that can be broken or left intact to optimize the frequency response of the antenna structure 800 for a particular operating resonance, depending on the region where the RFID device will be used (i.e. different countries use different frequencies for wireless tolling). Likewise, a link 808 can be used to control the resonance of the negative dipole element 814 and the bandwidth of the antenna response, and the other dipole element 810 can be shortened at an exposed location 812 by cutting through the conductor for further tuning. In addition, the ferrite element is shown in dash lines as shown in 816.

Accordingly, the embodiments provide the benefit of using a RFID tag device with increased gain in association with a mobile device to facilitate wireless transactions, allowing the user to take the RFID tag device with the user so that a variety of transactions can be completed in different locations, without tying the RFID tag device to one type of transaction, such as is the case with conventional RFID tag devices that are, for example, mounted in a vehicle for toll transactions.

Thus, the RFID tag device includes a circuit board 801 having a circuit board having a first side 803 and a second side (opposite the first side 803), and on the first side 803 is an antenna structure (800) that includes a loop antenna element 802 having feed side and a dipole side 805. The antenna structure further includes a pair of "L" shaped dipole elements 810, 814, each of which is connected to the loop antenna element 802 at a different point on the dipole side 805 of the loop antenna element 802 at a short leg portion of each dipole element 818, 820, and where each dipole element has a long leg portion 822, 824 that extends down below the loop antenna element 802 on the first side of the circuit board, on opposite sides of the loop antenna element 802. A longitudinal ferrite element 816 is disposed on the second side of the circuit board 801 in correspondence with the long leg portion 824 of one of the dipole elements. The dipole element 814 can be the negative dipole element which can have a long leg portion 824 that is at least twice as wide as the long leg portion 822 of the other dipole element 810. The long leg portions 822, 824 can extend a distance that is five to ten times the height (from feed side to the dipole side 805) of the loop antenna element 802. Both the loop antenna element 802 and the dipole elements 810, 814 can have removable conductor links that can be removed to adjust the tuning of the antenna structure for operation is a corresponding frequency band. In some embodiments the longitudinal ferrite element can be at least 70% the length of the long leg portion 824 of the dipole element 814 to which it corresponds, and is entirely over the long leg portion 824, meaning the ferrite element 816 does not extend beyond the long leg portion.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio frequency identification (RFID) tag device, comprising:
   a radio frequency (RF) interface that operates at a first RF frequency;
   a controller coupled to the RF interface; and
   an RFID antenna assembly comprising:
      a first dipole element and a second dipole element on a first side of a circuit board, wherein the first and second dipole elements are shaped as a half rectangle with an additional segment joining the respective element to a tuning element;
      a ferrite dielectric disposed on a second side of the circuit board, opposite the first side, wherein the ferrite dielectric is located in correspondence with one of the dipole elements; and
      the tuning element, which is a loop antenna, wherein the first and second dipole elements are printed on a surface of a printed circuit board,
      the first and second dipole elements are electrical mirror images of each other from a vertical centerline at a mid-point of the tuning element;
   wherein a structure of the RFID tag device establishes a distance between the RFID antenna assembly and internal components of a mobile device that functions as a ground plane such that, when the RFID tag device is coupled to the mobile device, the mobile device functions as a reflector to increase gain of the RFID antenna assembly, whereby improving transmission range of the RFID tag device relative to a range of the RFID tag device when not coupled to the mobile device, wherein the transmission range of the RFID tag device is improved by the mobile device functioning as the reflector is at least twenty feet.

2. The RFID tag device of claim 1, wherein no direct connection exists between the first and second dipole elements other than through the tuning element, to which the first and second dipole elements connect.

3. The RFID tag device of claim 1, wherein the RFID tag device is a multilayered structure, one layer comprising the RF interface, the controller, and the RFID antenna assembly, wherein the one layer is joined to an upper layer and to a lower layer of the multilayered structure by a low surface energy, press adhesive.

4. The RFID tag device of claim 3, wherein one of the layers of the multilayered structure is a foam layer, wherein the lower layer of the multilayered structure is an adhesive layer for coupling the RFID tag device to an exterior case of the mobile device, wherein the foam layer establishes a distance between the circuit board and the internal components of the mobile device that function as a ground plane to ensure the mobile device functions as the reflector to increase gain of the RFID antenna assembly as opposed to the ground plane attenuating a RF signal from the RFID antenna assembly.

5. The RFID tag device of claim 1, further comprising a near field communication (NFC) antenna assembly for capturing RF energy emitted from the mobile device to power circuitry of the RFID tag device.

6. A RFID tag device, comprising:
   a RF interface that operates at a first RF frequency;
   a controller coupled to the RF interface;
   an RFID antenna assembly comprising:
      a first dipole element and a second dipole element disposed on a first side of a circuit board;
      a ferrite dielectric disposed on a second side of the circuit board, opposite the first side, wherein the ferrite dielectric is located in correspondence with one of the dipole elements; and
      a tuning element, which is a loop antenna connecting each of the first and the second dipole elements to each other;
   wherein a vertical centerline exists at a mid-point of the tuning element, such that the first and second dipole elements are an electrical mirror image of each other from the vertical centerline; and
   a NFC antenna assembly for capturing RF energy emitted from a mobile device to which the RFID tag device is proximate, wherein the RF energy captured by the NFC antenna assembly powers circuitry of the RFID tag device to power signal transmissions from the RFID antenna assembly;

wherein a structure of the RFID tag device establishes a distance between the RFID antenna assembly and internal components of the mobile device that function as a ground plane such that, when the RFID tag device is coupled to the mobile device, the mobile device functions as a reflector to increase gain of the RFID antenna assembly thereby improving transmission range of the RFID tag device relative to a range of the RFID tag device when not coupled to the mobile device, wherein the transmission range improvement of the RFID tag device, as improved by the mobile device functioning as the reflector, is at least twenty feet.

7. The RFID tag device of claim 6, wherein the RFID tag device is a multilayered structure with the circuit board comprising one layer, the circuit board comprising the RF interface, the controller, the RF antenna assembly, and the NFC antenna assembly, wherein the circuit board is joined to an upper layer and to a lower layer of the multilayer structure via a low surface energy, press adhesive layer.

8. The RFID tag device of claim 7, wherein one of the layers of the multilayered structure is a foam layer, wherein the lower layer of the multilayered structure is an adhesive layer for coupling the RFID tag device to an exterior case of the mobile device.

9. A RFID tag device for use with a mobile device, comprising:
a RF interface that operates at a first RF frequency;
a controller coupled to the RF interface;
an RFID antenna assembly comprising:
 a first dipole element and a second dipole element disposed on a first side of a circuit board;
 a ferrite dielectric disposed on a second side of the circuit board, opposite the first side, wherein the ferrite dielectric is located in correspondence with one of the dipole elements; and
 a tuning element, which is a loop antenna connecting each of the first and the second dipole elements to each other;
wherein the RFID tag device is a multilayered structure in which the circuit board is one layer, the circuit board comprising the RF interface, the controller, the RF antenna assembly, wherein the circuit board is joined to an upper layer and to a lower layer of the multilayered structure via a low surface energy, press adhesive layer, wherein one of the layers of the multilayered structure is a foam layer, wherein the lower layer of the multilayered structure is an adhesive layer for coupling the RFID tag device to an exterior case of the mobile device, wherein the foam layer establishes a distance between the circuit board and internal components of the mobile device that function as a ground plane to ensure the mobile device functions as a reflector to increase gain of the RFID antenna assembly as opposed to the ground plane attenuating a RF signal from the RFID antenna assembly, wherein a transmission range improvement of the RFID tag device, as improved by the mobile device functioning as the reflector, is at least twenty feet.

10. The RFID tag device of claim 9, wherein the RFID antenna assembly is further configured such that a vertical centerline exists at a mid-point of the tuning element, such that the first and second dipole elements are mirror images of each other from the vertical centerline.

11. The RFID tag device of claim 9, wherein no direct connection exists between the first and second dipole elements other than through the tuning element, to which the first and second dipole elements connect.

12. The RFID tag device of claim 9, further comprising a near field communication (NFC) antenna assembly for capturing RF energy emitted from the mobile device to power circuitry of the RFID tag device.

13. The RFID tag device of claim 9, further comprising, wherein a distance between the internal components of the mobile device functioning as a ground plane and the RFID tag device's RFID antenna assembly when the RFID antenna assembly is attached via the lower layer is greater than 0.5 millimeters and less than 3 millimeters.

14. A RFID tag device, comprising:
a circuit board having a first side and a second side;
an antenna structure disposed on the first side that includes a loop antenna element having feed side and a dipole side, a pair of "L" shaped dipole elements, each of which is connected to the loop antenna element at a different point on the dipole side of the loop antenna element at a short leg portion of each dipole element, and where each dipole element has a long leg portion that extends down below the loop antenna element on the first side of the circuit board, on opposite sides of the loop antenna element, wherein the long leg portion of one of the dipole elements is at least twice as wide as the long leg portion of the other dipole element; and
a longitudinal ferrite element disposed on the second side of the circuit board in correspondence with the long leg portion of one of the dipole elements.

15. The RFID tag device of claim 14, wherein the circuit board is a multilayer circuit board and includes a ground plane between the first and second sides.

16. The RFID tag device of claim 14, wherein the long leg portions are at least five times longer than a height of the loop antenna element.

17. The RFID tag device of claim 14, wherein the longitudinal ferrite element has a length that is at least 70% of the long leg portion of the dipole element to which it corresponds.

* * * * *